Sept. 10, 1935.    E. J. SHIMEK    2,013,810
LOAD INDICATOR
Filed March 7, 1932    3 Sheets-Sheet 1

Edwin J. Shimek
Inventor

By J. Vincent Martin
Attorney

Sept. 10, 1935.  E. J. SHIMEK  2,013,810
LOAD INDICATOR
Filed March 7, 1932  3 Sheets-Sheet 2

Edwin J. Shimek
Inventor

By J. Vincent Martin
Attorney

Sept. 10, 1935. E. J. SHIMEK 2,013,810
LOAD INDICATOR
Filed March 7, 1932 3 Sheets-Sheet 3

Patented Sept. 10, 1935

2,013,810

UNITED STATES PATENT OFFICE 2,013,810

LOAD INDICATOR

Edwin J. Shimek, Houston, Tex.

Application March 7, 1932, Serial No. 597,135

5 Claims. (Cl. 265—47)

This invention relates to indicators for indicating loads on cables and other flexible elements under tension.

Indicators of this type include means to bend or deflect a portion of a cable, and load indicating means responsive to the forces tending to straighten it. These forces vary directly with the angle of deflection of the cable, and so calibration of the indicator is necessarily based on a given angle.

One of the principal objects of the present invention is to provide new and improved means to keep the angle of deflection of the cable substantially constant so that the indicator will at all times accurately indicate varying loads on the cable.

Conventional deep well drilling apparatus includes a cable having one end, known as the dead line, connected to a fixed support. The cable is passed through a crown block and a traveling block and has its other end wound upon a hoisting drum. The tension in the dead line, caused by a drill stem of a given weight, is therefore dependent upon the number of lines between the crown block and the traveling block. It is customary to connect a weight indicator to the dead line, the calibration of which is based on the number of lines between the traveling block and the crown block. When the number of lines is reduced or increased, another weight indicator must be used, or a great amount of time must be consumed and difficulties encountered in rearranging the parts of the weight indicator in use to compensate for the new mechanical advantage of the pulley assembly.

The new and improved load indicator provided by this invention will be found particularly useful for attachment to a dead line to indicate the weight of a drill stem, because it may be quickly and easily adjusted to accurately give the correct weight of the drill stem when the number of lines between the crown block and traveling block are varied; the adjustment being effected by changing the angle of deflection of the cable to compensate for the new mechanical advantage of the pulley assembly, without disturbing the load indicating means.

Other objects will hereinafter appear.

Figure 1:
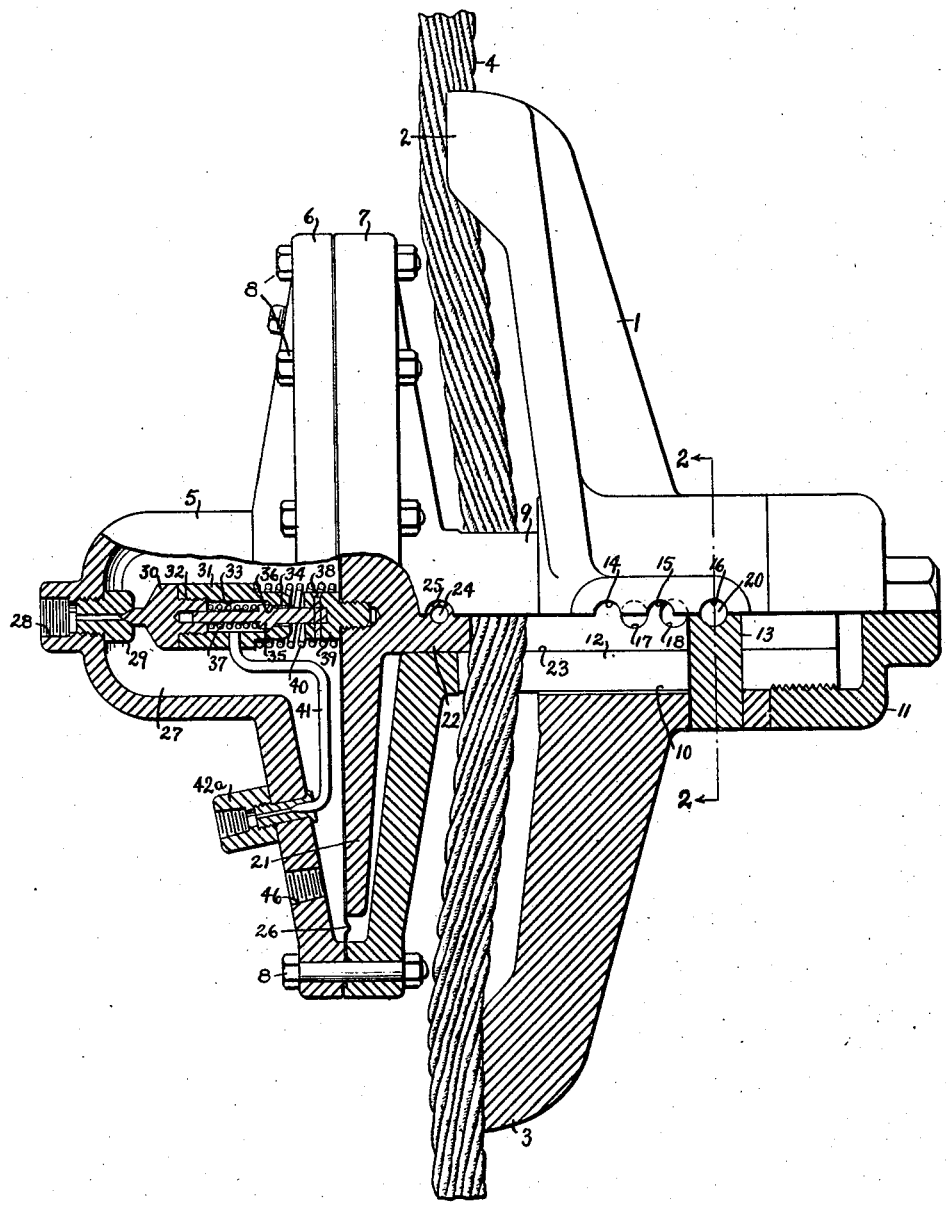
Figure 2:
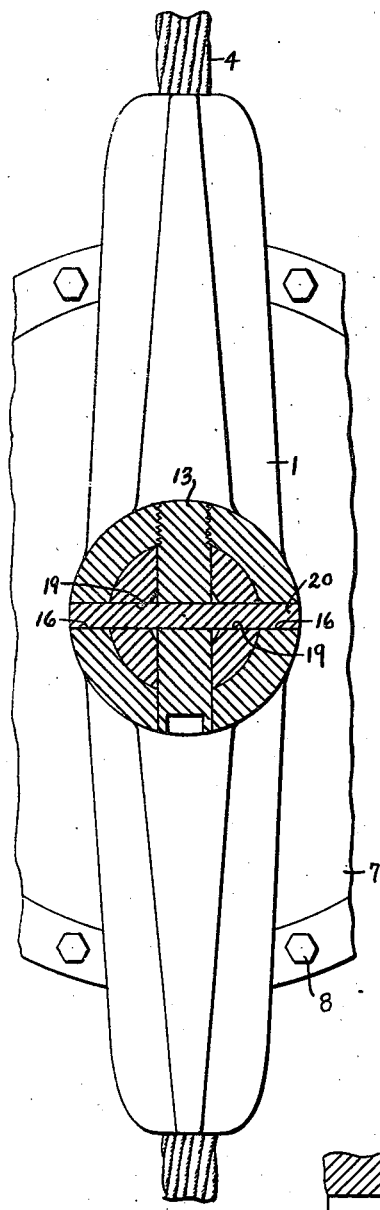
Figure 5:
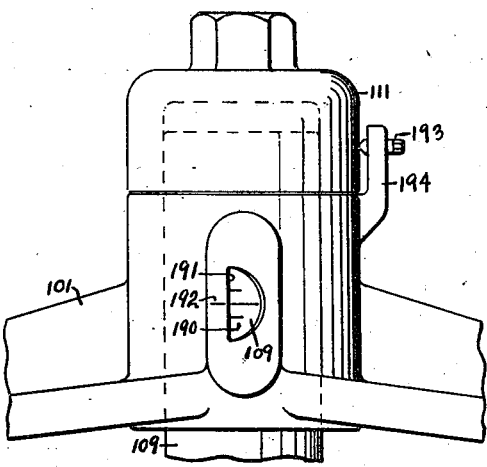
Figure 6:
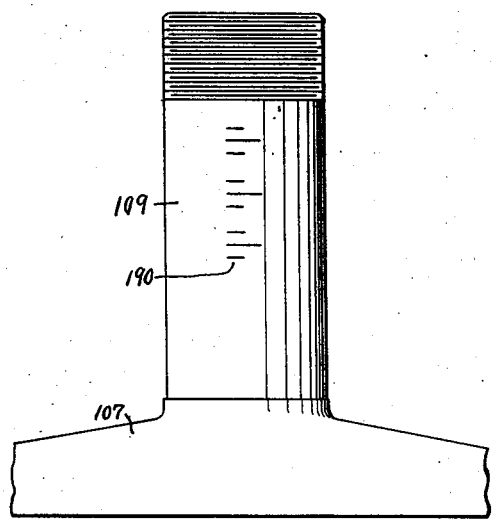
Figure 3:
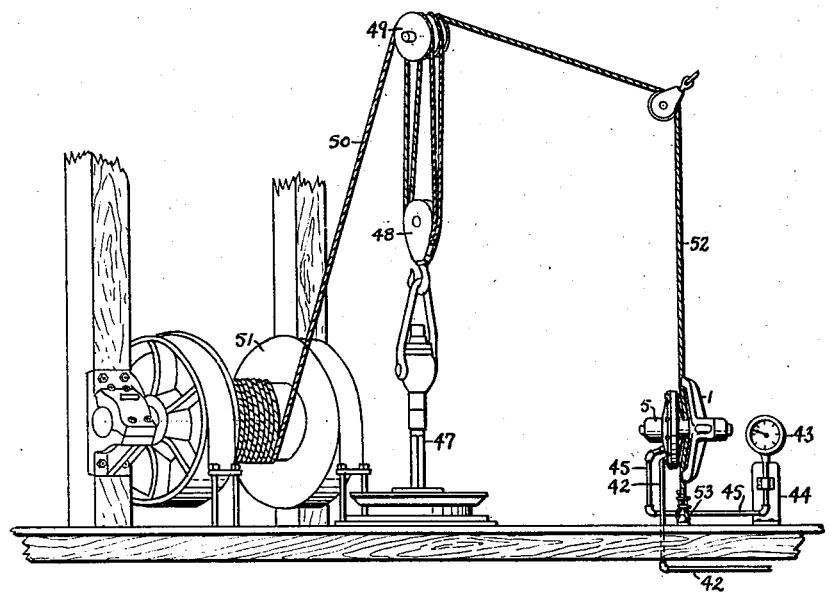
Figure 4:
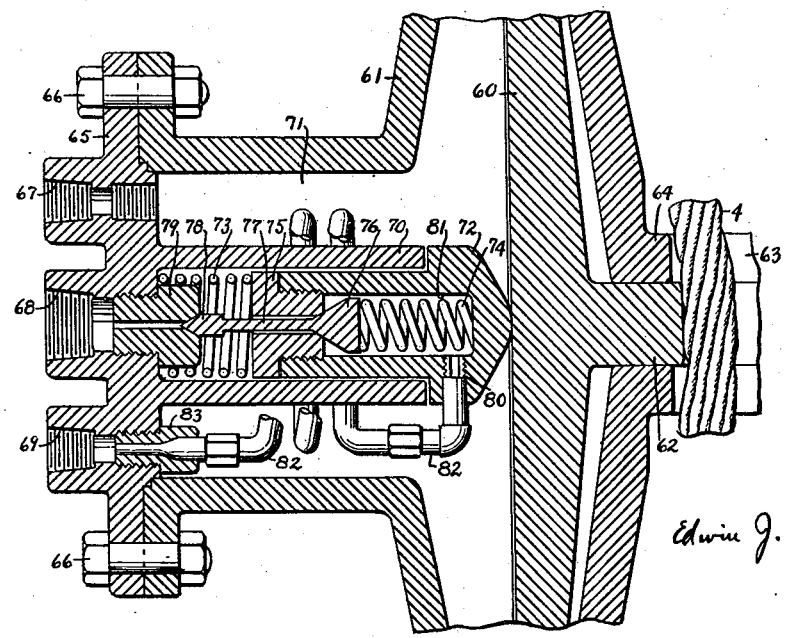

The preferred embodiments of the invention are illustrated by the accompanying drawings, of which Fig. 1 is a partly sectional elevation of one embodiment of the load indicator applied to a cable; Fig. 2, a section on the line 2—2 of Fig. 1; Fig. 3, a somewhat diagrammatic view of the load indicator applied to deep well drilling apparatus; Fig. 4, a fragmentary, sectional view of another embodiment of the invention; Fig. 5, a detail view of another embodiment showing the connecting means between the body shank and beam; Fig. 6, a detail view showing the body shank of Fig. 5; and Fig. 7, a detail view showing the means to lock the shank and beam of Fig. 5.

Referring to Figs. 1 and 2, the numeral 1 indicates a beam having transversely projecting arms 2 and 3 grooved for the reception of the cable 4. The body 5 may comprise two sections 6 and 7 connected by bolts 8. The inner section 7 of the body has a centrally disposed shank 9 projecting through a bore 10 in the beam 1 and held therein by a nut 11. The shank 9 is longitudinally slotted, as indicated at 12, for the reception of the cable 4 and a pin 13, the latter of which prevents rotation of the shank 9 in the bore 10. The beam 1 has therein a plurality of spaced openings 14, 15 and 16; and the shank 9 has adjacent thereto openings 17, 18 and 19. As shown clearly by Fig. 2, a pin 20 may be passed through the openings 16 and 19. The pin 13, as shown, has an opening therein to permit this. The shank 9 may be held in different positions in the bore 10 by passing the pin 20 through any two of the openings 14, 15 and 16, and 17, 18 and 19, for a purpose hereinafter set forth.

Within the body 5 is a member 21 having a central lug 22 projecting in the bore 23 of the shank 9 into engagement with the cable 4. The movement of the member 21 is limited by a pin 24 carried by the lug 22 and fitting in a relatively large opening 25 in the shank 9. The member 21 has a diaphragm 26 secured thereto and clamped by the bolts 8 between the sections 6 and 7, whereby a sealed pressure chamber 27 is formed in the body 5. The body 5 has an outlet port 28 in which is an outlet valve seat 29 for the outlet valve 30. The outlet valve 30 is connected to a cylinder 31 by threads 32. The cylinder 31 forms a chamber 33. The chambers 33 and 27 are connected by a port 34; and the passage of fluid from the chamber 33 to the chamber 27 through the port 34 is controlled by a valve 35 normally held upon a seat 36 by a compression spring 37. The valve 35 is connected by a pin 38 to a plug 39 carried by the member 21, and a compression spring 40 may be used to assist the spring 37 in normally keeping the valve 35 closed.

The chamber 33 is supplied with fluid under pressure, such as steam or the like, by a pipe 41 connected as indicated at 42a (Fig. 1) to a supply pipe 42 (Fig. 3). The supply pipe 42 may be connected to a boiler or other source of supply (not shown). A pressure gauge 43 mounted on some convenient support 44 may be connected by a pipe 45 (Fig. 3) to the body 5 at 46 (Fig. 1).

In Fig. 3, which illustrates conventional deep well drilling apparatus, the numeral 47 indicates a drill stem which is connected to a traveling block 48 supported by a crown block 49, the latter of which is stationarily mounted in the derrick, not shown. One end of the cable 50 is wound upon a hoisting drum 51, and the dead line 52 of the cable is connected to a stationary support 53. The load indicator may be applied to the dead line 52, as shown.

It will be understood that this invention may be used wherever means are described to indicate varying loads on a flexible member under tension. The invention will be found particularly useful, however, in connection with deep well drilling apparatus, as follows:

In deep well drilling, it is essential that certain pressures be applied to drill bits to insure efficient cutting of certain formations. The application of greater pressures must be prevented to avoid damage to the drilling apparatus.

The pressure on a drill bit is afforded by a heavy drill stem which comprises a plurality of pipe sections, to the lowermost of which the drill bit is attached. The weight of a lengthy drill stem imparts a pressure greater than can be used advantageously or even safely, under usual conditions, and it is now customary for the driller to repeatedly ascertain the weight of the stem by means of weight indicators and then so adjust the stem supporting mechanism that the excessive part of the stem weight is thereby supported.

In Fig. 3, the dead line 52 is in the place of the cable 4 of Fig. 1. The tension in the dead line 52 will be dependent upon the weight of the drill stem 47. As the weight of the drill stem 47 is placed upon the traveling block 48, the dead line 52 will exert two transverse forces in one direction against the arms 2 and 3 of the beam 1, and one transverse force in the other direction against the lug 22 of the member 21; whereby the member 21 will be forced a very slight distance in the chamber 27. Now as the normally closed inlet valve 35 is carried by the member 21, and the inlet valve seat 36 is held by the cylinder 31, the outlet valve 30, and the outlet valve seat 29, the inlet valve 35 will be opened, so that fluid under pressure from the inlet chamber 33 thereupon enters the pressure chamber 27 to immediately increase the pressure of the fluid in chamber 27 and prevent further inward movement of the member 21. It will be understood that the pressure of the fluid in the supply pipe 42, pipe 41 and chamber 33 is sufficient to create a pressure in the chamber 27 that will prevent such further inward movement of the diaphragm even when there is on the dead line 52 a maximum load. And so, the member 21 is never permitted to move inwardly more than a very short distance.

Now when the load of the drill stem 47 on the traveling block 48 is decreased, the tension in the dead line 52 will be decreased, so that the fluid under pressure in the chamber 27 will force the member 21 outwardly. When the member 21 is moved outwardly only a very short distance, the exhaust valve 30 is opened because it is carried by the member 21, and fluid is thereby permitted to escape from the chamber 27, so that the pressure of the fluid in the chamber 27 is quickly reduced. The member is thus prevented from moving outwardly more than a short distance.

It will be apparent from the foregoing that as the inward and outward movement of the member 21 is very slight, the lug 22 of the member, and the arms 2 and 3 of the beam will remain in substantially the same positions with respect to each other as the load varies, so that the angle of deflection of the cable may be regarded as remaining practically constant. This is important because the pressure in the chamber 27 is dependent not only on the load on the cable but also on the angle of deflection of the cable; and so a certain load on the cable invariably creates a certain pressure in the chamber 27 and the calibrated pressure gauge 43 accurately indicates the varying weights of the drill stem.

It may be added that if some of the liquid escapes from the pressure chamber of a conventional weight indicator or if some gas is present or if the temperature of the liquid in the pressure chamber is increased or reduced appreciably, the angle of deflection of the cable is changed; and, as the calibration of the pressure indicator is necessarily based on a certain angle of deflection, it cannot thereafter indicate the correct load on the cable. As above stated, this invention provides new and improved means to keep the angle of deflection substantially constant, to cause accurate indications.

Referring now to Fig. 3, it will be apparent that the upward pull on the dead line 52 would be dependent not only on the downward pull by the drill stem 47 on the traveling block 48 but also on the number of lines between the traveling block 48 and crown block 49. In the apparatus shown, the upward pull on the dead line 52 will be one-fourth of the downward pull on the traveling block 48, the mechanical advantage being 4 to 1. This will create a certain pressure in the chamber 27 and the pressure gauge 43 will indicate a certain weight. When the mechanical advantage of the pulleys is changed to 6 to 1, or 8 to 1, by adding lines between the traveling block 48 and 49, the pull on the dead line 52 will be proportionately less for the same stem load and the pressure in the chamber 27 will therefore be less so that the gauge 43 will not indicate the correct weight of the drill stem 47. Now, as above stated, the pressure of the fluid in the chamber 27 is dependent not only on the tension in the cable but also upon the angle of deflection of the cable, and this angle of deflection is fixed by holding the arms 2 and 3 of the beam 1 and the lug 22 of the member 21 in predetermined positions with respect to each other, by placing the pin 20 in openings in the beam 1 and shank 9. To make the gauge 43 indicate the same weight when the mechanical advantage of the pulleys is increased, the angle of deflection of the cable is increased by removing the pin 20 from the openings 16 in beam 1 and the openings 19 in shank 9, moving the shank 9 further in the bore 10, and then placing the pin 20 in the openings 15 and 18, or 14 and 17. Although the load on the dead line 52 is less because of the mechanical advantage of the pulleys, the dead line exerts a greater force on the diaphragm when the angle of deflection is increased, so that the pressure in the chamber 27 is the same as it was when the load on the dead line was greater. And therefore the pressure gauge 43 indicates the same weight it indicated before the mechanical advantage of the pulleys was changed.

In view of the foregoing, it is unnecessary to use any additional apparatus when the mechanical advantage of the pulleys is changed. The pressure gauge and all other parts remain in place. It is necessary only to change the angle of deflection of the cable by placing the pin 20 in different holes.

Fig. 4 illustrates another embodiment. In this embodiment, the member 60 may be mounted in the body 61 (as suggested by Fig. 1) and provided with a lug 62 to engage the cable 4 extending through the slot 63 in shank 64.

A diaphragm 65 is secured to the member 61 by bolts 66 and has means 67 to which the pressure gauge 43 (Fig. 3) may be connected; an exhaust opening 68; and an inlet opening 69 to which the inlet pipe 42 may be connected. The base 65 has a central cylinder 70 projecting into the pressure chamber 71. A plunger 72 is movable in the cylinder 70 and is held against the member 60 by compression springs 73 and 74. The spring 73 bears against the base 65 and the plug 75 of the plunger 72; and the spring 74 bears against the inlet valve 76 and the plunger 72. The inlet valve 76 is adapted to fit a seat formed by the plug 75, and is connected by a rod 77 with the outlet valve 78. The outlet valve 78 is adapted to engage a seat formed by a plug 79 in the base 65. Connected to the plunger 72 at 80 and communicating with its inlet chamber 81 is a pipe 82 connected as indicated at 83 to the base 65, and to which the supply pipe 42 may be connected at 69.

When the member 60 is moved a slight distance inwardly in the chamber 71, it will move the plunger 72 to move the inlet valve seat away from the inlet valve 76, whereupon fluid under pressure will escape from the pressure chamber 81, through the plug 75, between the plunger 72 and cylinder 70 into the chamber 71 to prevent further inward movement of the member 60. Fluid under pressure escaping from the chamber 81 is replaced by fluid entering through supply pipe 42 and pipe 82. The pipe 82 is coiled about the cylinder 70 so that it will be flexible and not interfere with the movement of the plunger 72 in the cylinder 70.

The fluid under pressure in the chamber 71 will move the member 60 outwardly a slight distance when the load on the cable is reduced, and the springs 73 and 74 will cause the plunger 72 to follow the member 60 so that the outlet valve 78 will be opened, and a portion of the fluid in the chamber 71 will be permitted to escape from the chamber 71, between the cylinder 70 and plunger 72 through the plug 79 and out of exhaust openings 68, to prevent further outward movement of the member.

As the pressure operated elements of the embodiment just described are carried by the base 65 they may be readily removed and replaced as a unit.

Figure 7:
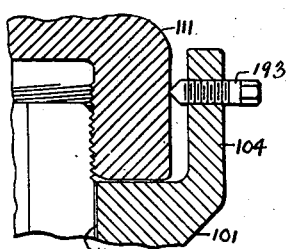

Figs. 5, 6 and 7 illustrate another embodiment of means whereby the angle of deflection of the cable may be changed to compensate for the mechanical advantage of pulley assemblies or the like. The elements of this embodiment correspond to the elements of the Fig. 1 embodiment, as indicated by the numerals. The beam is indicated at 101; the adjacent section of the body at 107; and the shank of the body at 109. The shank 109 is held in the bore 110 of the body by a nut 111. The shank 109 is marked as indicated at 190 and the beam has an opening 191 and adjacent thereto a mark 192. The marks 190 and 192 are so disposed that when mark 192 is coincident with one of the marks 190, a diaphragm lug corresponding to the lug 22 of Fig. 1 is in a predetermined position with respect to beam arms corresponding to the arms 2 and 3 shown by Fig. 1 so that the angle of deflection of the cable is necessarily a predetermined number of degrees.

The screw 111 is rotated to cause one of the marks 190 to coincide with the mark 192 to fix the angle of deflection of the cable; and a set screw 193 carried by an arm 194 integral with beam 101 is then screwed inwardly into engagement with the nut 111 to lock the parts in place.

It is to be understood that this invention is not limited to the preferred embodiments herein disclosed. Various changes may be made within the scope of the following claims.

I claim:

1. A tension indicator adapted to be attached to the dead end line of a well drilling rig, comprising a beam adapted to engage the dead end line at two spaced points, pressure operated means for deflecting said line between said points, and for maintaining said deflection substantially constant, pressure responsive means indicating the force required to maintain said deflection and means for adjusting the degree of such deflection in accordance with the mechanical advantage obtained by the load support of said rig.

2. A load indicator adapted to be attached to the dead end line of a well drilling rig, comprising a beam adapted to engage the dead end line at two spaced points, pressure operated means for deflecting said line between said points, said pressure operated means serving to maintain said deflection substantially constant irrespective of the tension of said line and means for adjusting the angle of deflection in accordance with the mechanical advantage obtained by the load support pulleys of said rig whereby a given calibration of said pressure responsive means may be used with rings of different mechanical advantage.

3. A tension indicator for showing the tension exerted on a flexible cable comprising a beam adapted to engage the cable at two spaced points, a diaphragm chamber having a diaphragm therein, said diaphragm having a member secured thereto and adapted to engage the cable intermediate the points of engagement of said beam, fluid pressure means for exerting pressure upon said diaphragm to deflect the portion of the cable intermediate the points of engagement of said beam, and for maintaining the angle of deflection of said cable substantially constant irrespective of the tension thereof, and means for adjustably connecting the diaphragm chamber to said beam whereby the said angle of deflection may be varied in accordance with the mechanical advantage of the apparatus with which the indicator may be used.

4. A load indicator adapted to be attached to the dead end line of a well drilling rig comprising a beam adapted to engage said line at a pair of spaced points, a diaphragm chamber having a diaphragm therein, said diaphragm having a member adapted to engage the cable at a point intermediate the points of engagement of said beam, said diaphragm chamber having a bifurcated member passing into a bore in said beam, means for securing said bifurcated member within said beam in a plurality of different positions whereby the angle of deflection of the cable may be variably set, and pressure responsive means for maintaining the angle of deflection of the cable substantially constant at the angle set irrespective of the tension thereon.

5. A load indicator adapted to be attached to the dead end line of a well drilling rig comprising a beam adapted to engage the line at two spaced points, a diaphragm chamber having a diaphragm therein, said diaphragm chamber having adjustable means for securing it to said beam, a member secured to said diaphragm and adapted to engage the cable at a point intermediate the points of engagement of said beam whereby a portion of the cable is deflected, pressure responsive means for maintaining said angle of deflection substantially constant, said means for connecting said diaphragm chamber with said beam comprising a plurality of apertures located in said beam and a plurality of corresponding apertures within the portion of said diaphragm chamber adjacent said beam, and a pin for locking said members in engagement whereby the angle of deflection of said cable may be varied in accordance with the mechanical advantage of the particular well drilling rig with which the indicator is used.

EDWIN J. SHIMEK.